(12) United States Patent
Adams et al.

(10) Patent No.: US 12,051,819 B2
(45) Date of Patent: Jul. 30, 2024

(54) BATTERY HOLDER

(71) Applicant: ADAMS IP PTY LTD, Queensland (AU)

(72) Inventors: Darren Barry Adams, Queensland (AU); Annette Marie Adams, Queensland (AU)

(73) Assignee: ADAMS IP PTY LTD., Queensland (AU)

( * ) Notice: Subject to any disclaimer, the term of this patent is extended or adjusted under 35 U.S.C. 154(b) by 319 days.

(21) Appl. No.: 17/270,532

(22) PCT Filed: Aug. 22, 2019

(86) PCT No.: PCT/AU2019/050887
§ 371 (c)(1),
(2) Date: Feb. 23, 2021

(87) PCT Pub. No.: WO2020/037371
PCT Pub. Date: Feb. 27, 2020

(65) Prior Publication Data
US 2021/0351473 A1 Nov. 11, 2021

(30) Foreign Application Priority Data
Aug. 23, 2018 (AU) .................. 2018220113

(51) Int. Cl.
*H01M 50/247* (2021.01)
*H01M 50/202* (2021.01)
*H01M 50/204* (2021.01)
*H01M 50/244* (2021.01)
*H01M 50/264* (2021.01)

(52) U.S. Cl.
CPC ....... *H01M 50/247* (2021.01); *H01M 50/202* (2021.01); *H01M 50/204* (2021.01); *H01M 50/244* (2021.01); *H01M 50/264* (2021.01); *H01M 2220/30* (2013.01)

(58) Field of Classification Search
None
See application file for complete search history.

(56) References Cited

U.S. PATENT DOCUMENTS

D327,247 S * 6/1992 Higuchi ................ D13/108
D507,235 S * 7/2005 Rozwadowski ......... D13/108
(Continued)

FOREIGN PATENT DOCUMENTS

JP 2013004224 A 1/2013
JP 2013045689 A 3/2013
(Continued)

OTHER PUBLICATIONS

"Makita StealthMounts | Makita battery storage system." YouTube, uploaded by Tools & Stuff, Dec. 17, 2017, https://www.youtube.com/watch?v=zuhS-i1_qWk.—1 page—Web capture (Year: 2017).*
(Continued)

*Primary Examiner* — Gregg Cantelmo
(74) *Attorney, Agent, or Firm* — Dinsmore & Shohl LLP

(57) ABSTRACT

The present invention relates to a battery holder including at least one compartment for receiving a battery, the compartment including a first side wall, second side wall, rear wall, base and a locking portion to secure the battery.

14 Claims, 11 Drawing Sheets

(56) References Cited

U.S. PATENT DOCUMENTS

| | | | | |
|---|---|---|---|---|
| D734,725 S | * | 7/2015 | Pickens | B60L 15/20 |
| | | | | D13/139.1 |
| D932,880 S | * | 10/2021 | Trammell | B60L 15/20 |
| | | | | D8/373 |
| 2007/0184339 A1 | * | 8/2007 | Scheucher | B60L 15/20 |
| | | | | 211/13.1 |
| 2014/0321034 A1 | * | 10/2014 | Takeuchi | H01M 50/227 |
| | | | | 361/679.01 |
| 2014/0361740 A1 | * | 12/2014 | Suzuki | H02J 7/0013 |
| | | | | 320/108 |
| 2016/0322844 A1 | | 11/2016 | Pickens et al. | |
| 2016/0336555 A1 | * | 11/2016 | Guen | H01M 50/256 |
| 2017/0070067 A1 | | 3/2017 | Suzuki et al. | |

FOREIGN PATENT DOCUMENTS

| | | |
|---|---|---|
| JP | 2013111673 A | 6/2013 |
| JP | 2016062808 A | 4/2016 |
| JP | 2017182917 A | 10/2017 |

OTHER PUBLICATIONS

"Makita StealthMounts | Makita battery storage system." YouTube, uploaded by Tools & Stuff, Dec. 17, 2017, https://www.youtube.com/watch?v=zuhS-i1_qWk.—5 pages of screenshots of the video (Year: 2017).*

European Search Report completed by Mar. 11, 2022 in reference to European Patent Application No. EP19851045 filed Aug. 22, 2019.

Stealthmounts, Bibliographic information for "Stealth Mounts for Cordless DeWalt, Makita and Bosch tool batteries", pp. 1-2, 2016.

International Search Report issued by the Australian Patent Office as International Searching Authority for International Patent Application No. PCT/AU2019/050887 dated Nov. 25, 2019 (3 pages).

Japanese Office Action regarding co-pending application No. JP2021534399 filed Sep. 19, 2023.

* cited by examiner

BATTERY HOLDER

FIELD OF THE INVENTION

The present invention relates to a hand-held power tool battery holder.

BACKGROUND TO THE INVENTION

There is an ever increasing prevalence of battery powered hand tools, such as for example drills, grinders and sanders. Initially battery powered tools lacked power and were only suitable for small home handyman jobs. However, such tools are no longer so limited, and provide sufficient power to meet the needs of professionals.

Battery powered hand tools would now be the favoured option for tradespeople. The use of battery powered devices on work sites provides greater flexibility and efficiencies for the tradesperson. No longer is it necessary to work with long power cords that both require a power source and present a safety hazard.

While the power of battery powered hand tools is sufficient to meet the needs of the professional tradesperson, the battery life is not unlimited. There is a limited time that the tool can be operated before the battery needs recharging.

As a result the tradesperson will normally have multiple batteries suitable for use on the same tool. In fact, the same battery could be suitable for a number of tools. Tool manufacturers recognised that a tradesperson would often need multiple different tools but could only use one tool at a time. The manufacturers therefore designed their various tools with interchangeable batteries. In this way, a tradesperson could first use a circular saw for example, and then when the tradesperson was finished with the circular saw and needed a drill, the battery could be removed from the circular saw and attached to the drill.

Initially this offered some flexibility. But it also encouraged tradespeople to keep multiple battery packs. On site when one battery pack became exhausted the tradesperson would simply swap the battery pack for another that was fully charged. In some cases the exhausted battery pack would be recharged on site. In other cases the tradesperson would recharge the battery overnight.

The difficulty or limitation with owning multiple battery packs is the need to store them. It is not practical to store a large number of batteries on individual tools, as a tradesperson may only use a small number of tools in a given period, while still needing to rotate through a large number of batteries. Likewise, storing batteries in a battery charger is not convenient as some battery chargers typically only charge or hold one battery at a time and charging stations designed for multiple batteries can be expensive, bulky and difficult to transport.

In some cases, the result is multiple batteries are simply left on work benches or in tool bags. This increases the risk of damage to the battery pack, which could reduce the performance and/or life of the battery.

An alternative is needed that enables the tradesperson to have sufficient battery power without the same risk of damage or loss of batteries that currently exists.

SUMMARY OF THE INVENTION

In a broad form, there is provided a battery holder that holds at least one power tool battery.

In a first aspect, there is provided a battery holder including at least one compartment for receiving a battery, said compartment including a first side wall, second side wall, rear wall, base and a locking portion to secure said battery, Preferably, at least one of the first side wall or the second side wall includes a lip to engage the battery. This lip can also assist with sliding the battery into position.

The locking portion may be located opposite the rear wall in the base of the compartment. Alternatively, the locking portion may be located in at least one of the first side wall or the second side wall. In this case the lip of the side wall(s) may also comprise the locking portion.

The location of the locking portion reflects the brand of battery that is to be housed.

In alternative terms the at least one compartment is a female component moulded to complement a male component of the battery to be stored.

BRIEF DESCRIPTION OF THE DRAWINGS

An illustrative embodiment of the present invention will now be described with reference to the accompanying figures. Further features and advantages of the invention will also become apparent from the accompanying description.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention provides a battery holder that is able to hold multiple battery packs at one time. Ideally, the holder will be configured to suit a particular brand of battery pack so as to best ensure safe storage of the battery packs.

Figure 1:
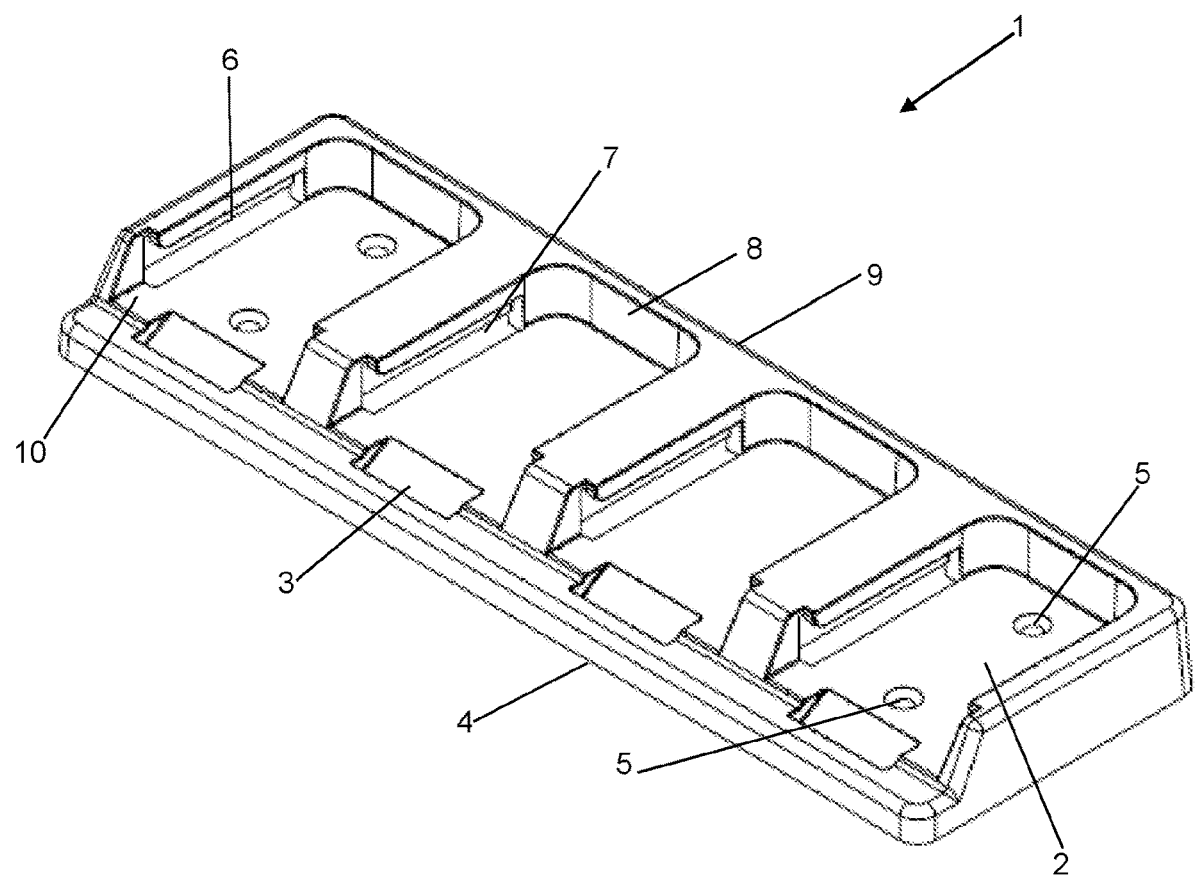
FIG. 1 shows a battery holder in accordance with one embodiment of the present invention.
Figure 2A:
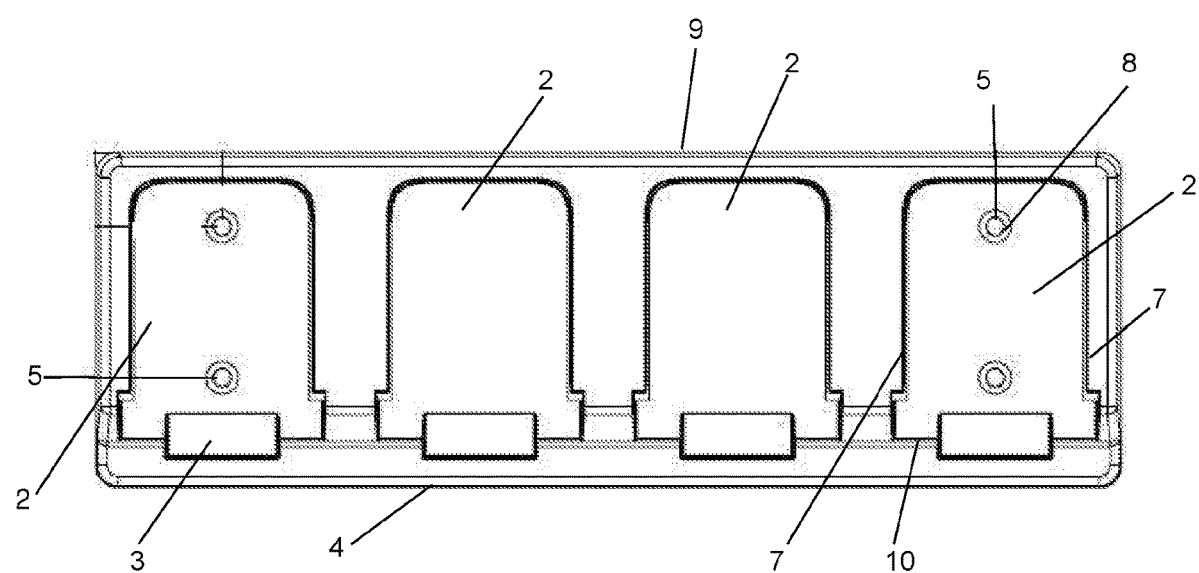
FIG. 2 shows alternate views of the battery holder of FIG. 1.
Figure 2B:
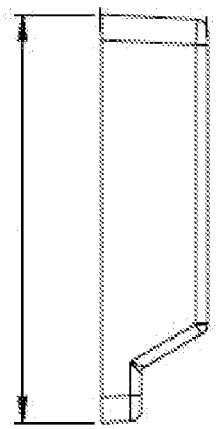
Figure 2C:
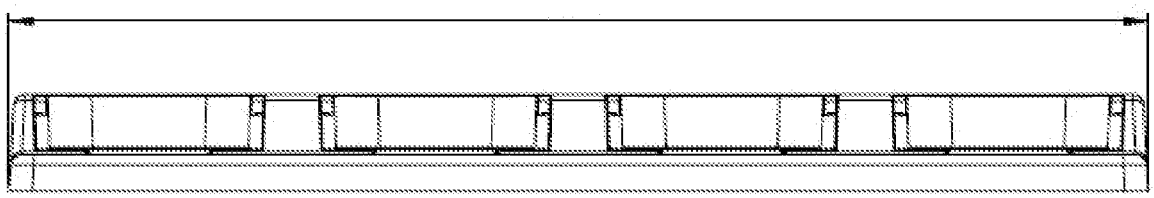
Figure 3A:
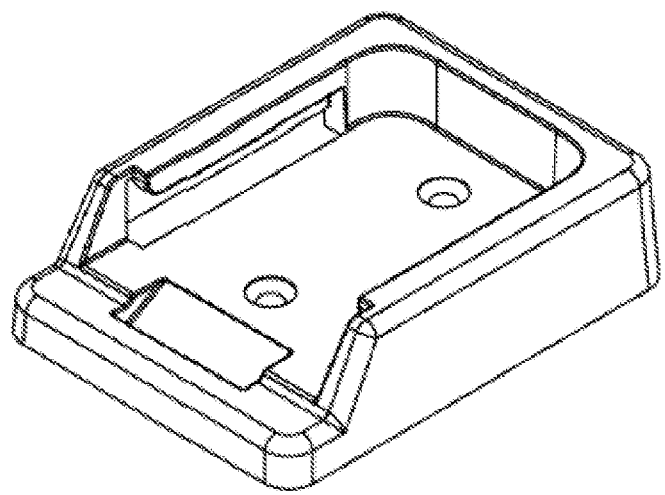
FIG. 3 shows alternative embodiments of a battery holder.
Figure 3B:
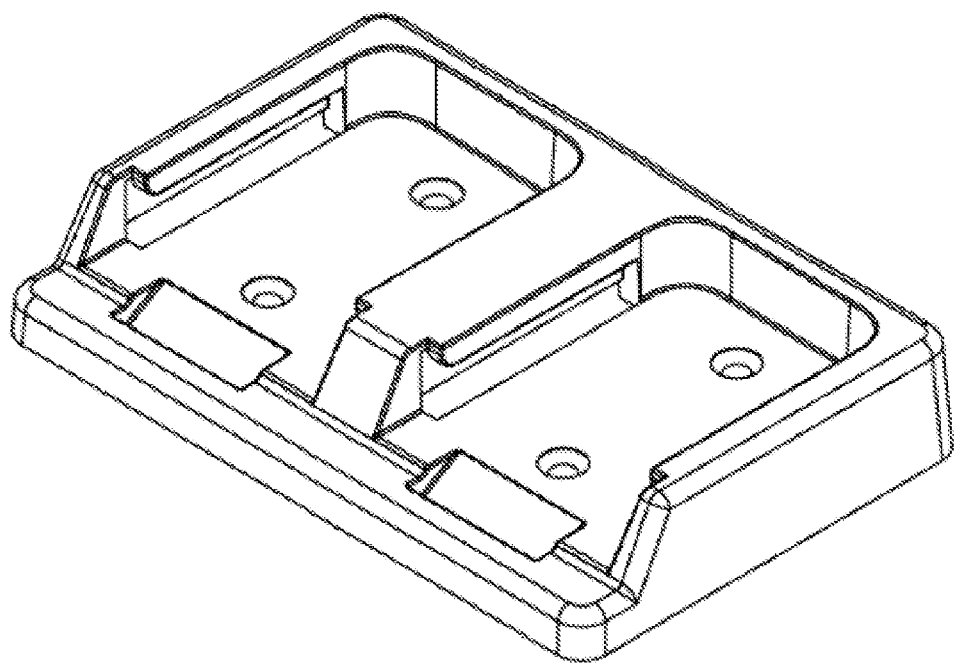
Figure 3C:
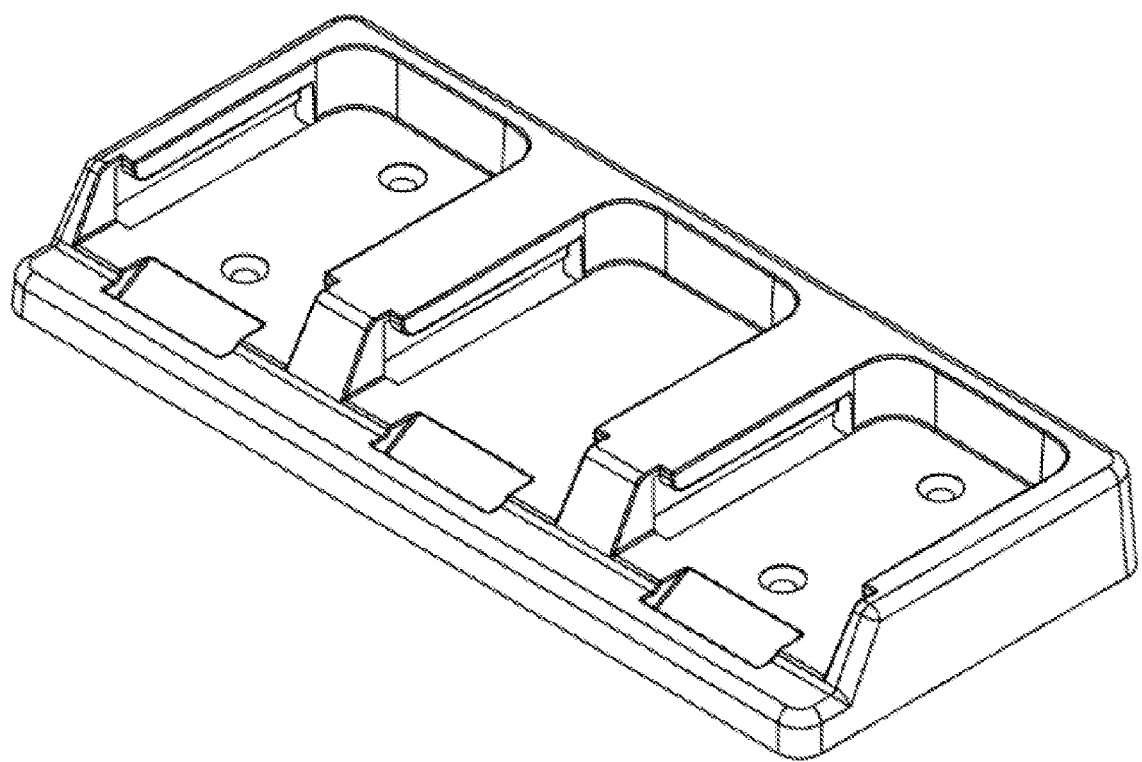
Figure 3D:
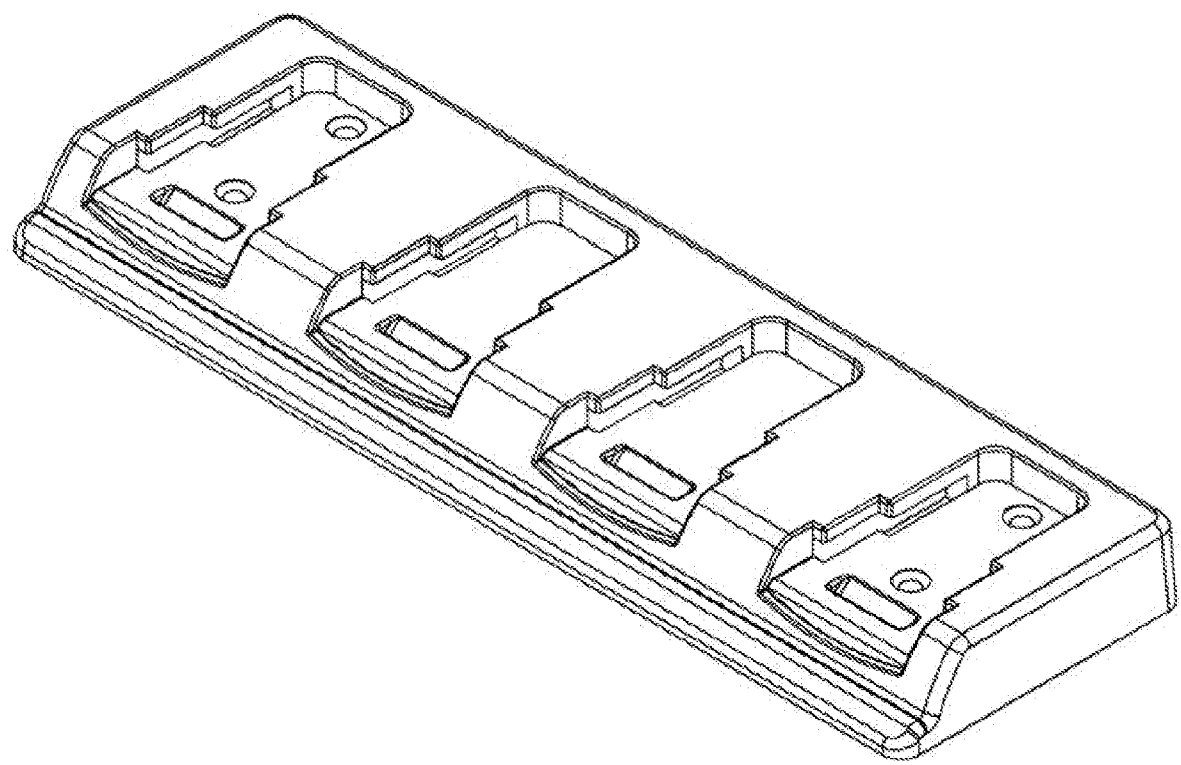
Figure 3E:
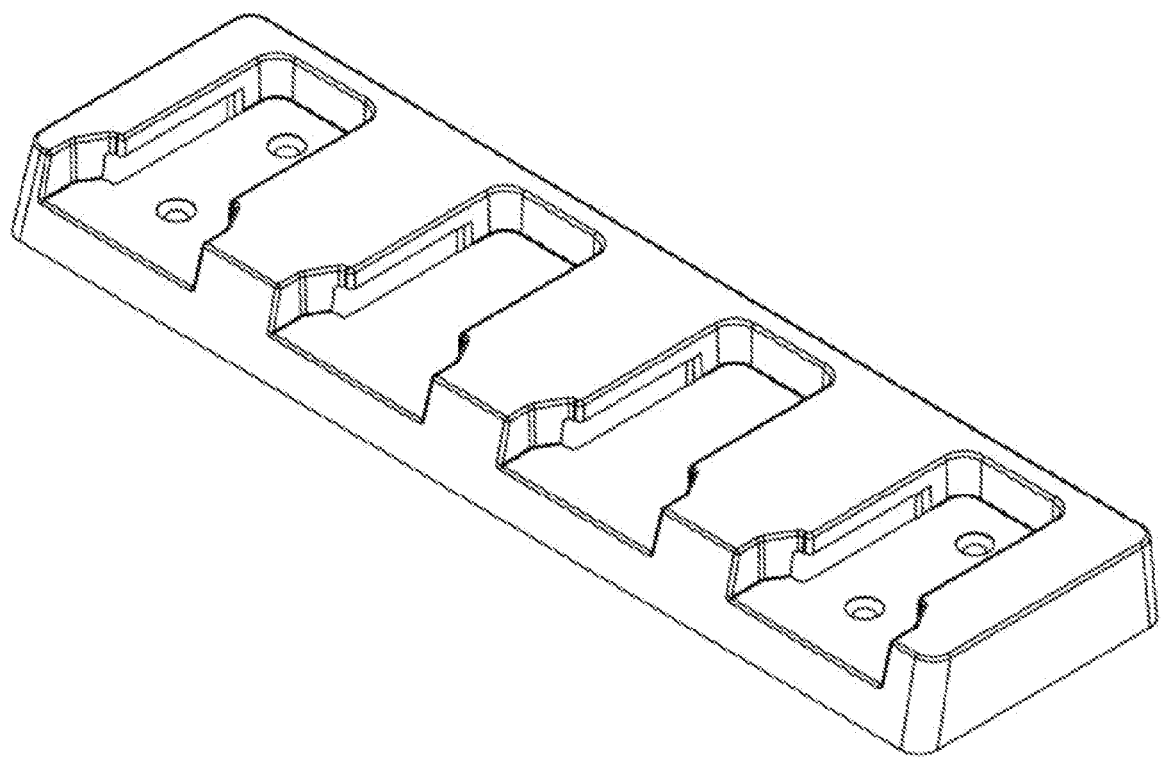
Figure 3F:
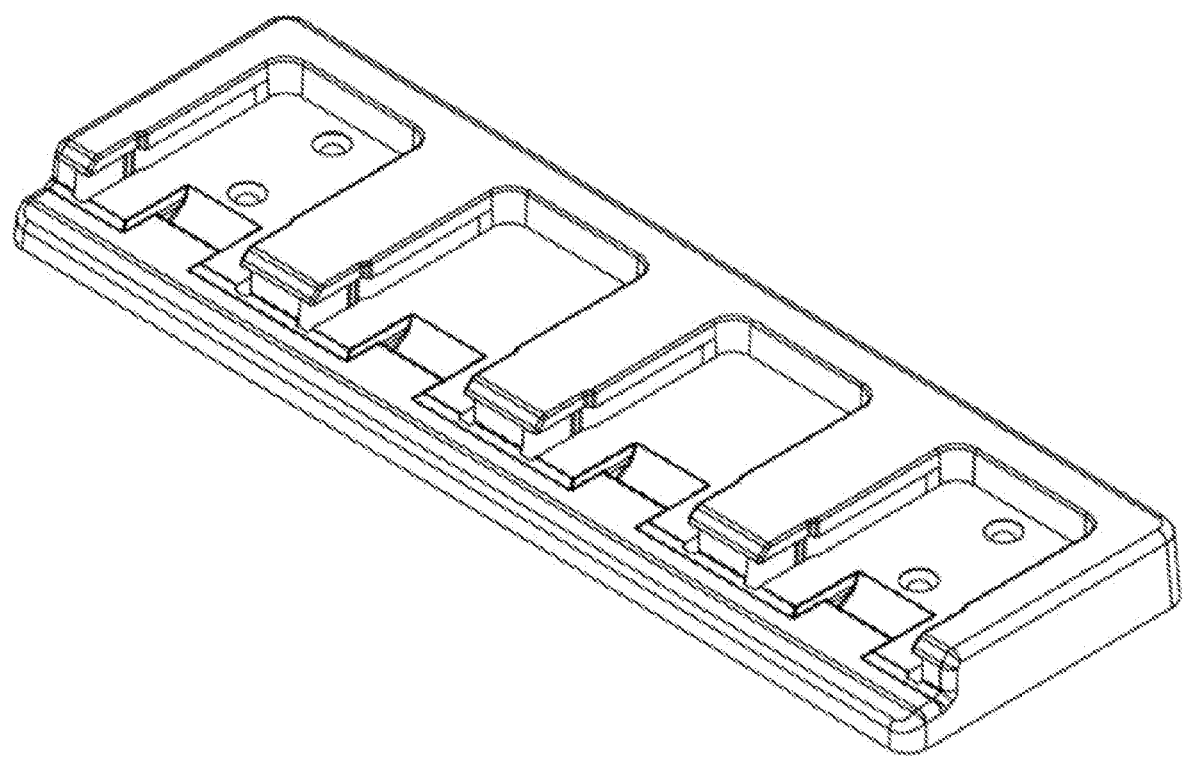
Figure 3G:
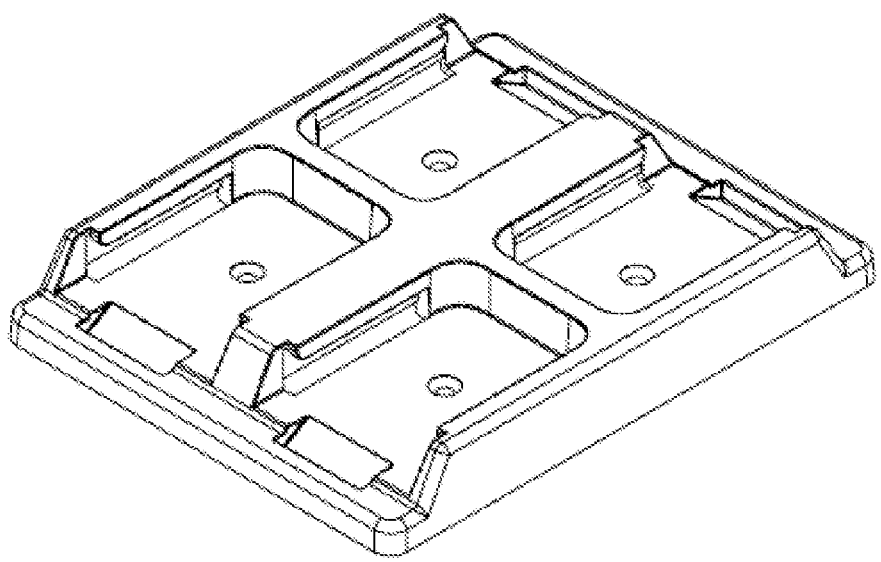

Referring to FIG. 1, there is shown an example of one such battery holder. The holder of FIG. 1 has been designed to specifically accommodate Makita branded battery packs. It can be seen that the holder of FIG. 1 is suitable for storing four battery packs. It will be appreciated that alternative embodiments may store less or more battery packs as required. For example, an alternative embodiment may store six battery packs.

The battery holder 1 includes a plurality of battery compartments 2. Each battery compartment 2 includes a recess to receive a battery. Preferably the recess is designed to accommodate a particular branded battery.

Each compartment 2, includes two enclosed side walls 7, and a rear wall 8. Preferably the height of the side walls 7 and rear walls 8, is around 14 mm (for a Makita model) to guide the battery into place. An open side 10 is provided for the battery to enter the holder 1. To further assist guidance of the battery into position, and to also assist in retaining the battery in position, a lip 6 may be included along a portion of a, or each, side wall 7. Conveniently, the open side 10 of each compartment 2 will be on the front edge 4 of the holder 1.

Each compartment 2 should include a locking portion 3 or mechanism. This locking portion 3 should be compatible with the particular battery to be stored. For example, compartments configured to receive Makita branded batteries ideally have a recessed locking portion 35 mm by 14 mm by 5 mm. Again for Makita branded batteries the locking portion is located along or about the open side 10 of the compartment 2.

In the preferred arrangement, the holder 1 is around 318 mm in length, with a spacing of around 24 mm between side walls 7 of adjacent compartments 2. The height of the holder 1 may be around 104 mm. This provides sufficient space for each compartment 2 to be housed, without excessive need of material needed to create a larger body. It will be appreciated however, that some applications may include extra space between the rear wall 8 of each compartment 2 and the top edge 9 of the holder 1. This may be the case if for example a brand name or other information is desired to be included on the face of the holder 1.

The length of preferred arrangements of the holder is between 318 mm and 331.5 mm. The height ranges between 22.5 to 27 mm, and the width between 90 mm to 104 mm.

In the case of a compartment suitable for a Makita branded battery, the preferred dimension would be around 56 mm by 71 mm by 14 mm.

The preferred embodiment also includes screw holes 5, to facilitate mounting of the holder 1. Preferably, the screw holes 5 are countersunk so as to allow a screw head to sit flush, or below, the surface of the holder 1, and thereby reduce the risk of damage to a battery during insertion into the holder. For example, the screw hole may be:

Countersink width for the head diameter 10 mm
Countersink depth for the head height 2.5 mm
Hole width for the screw diameter 5.5 mm The reverse side (not shown) of the holder 1 may include ribbing designed to provide strength and successful injection moulding without distortion.

Figure 4A:
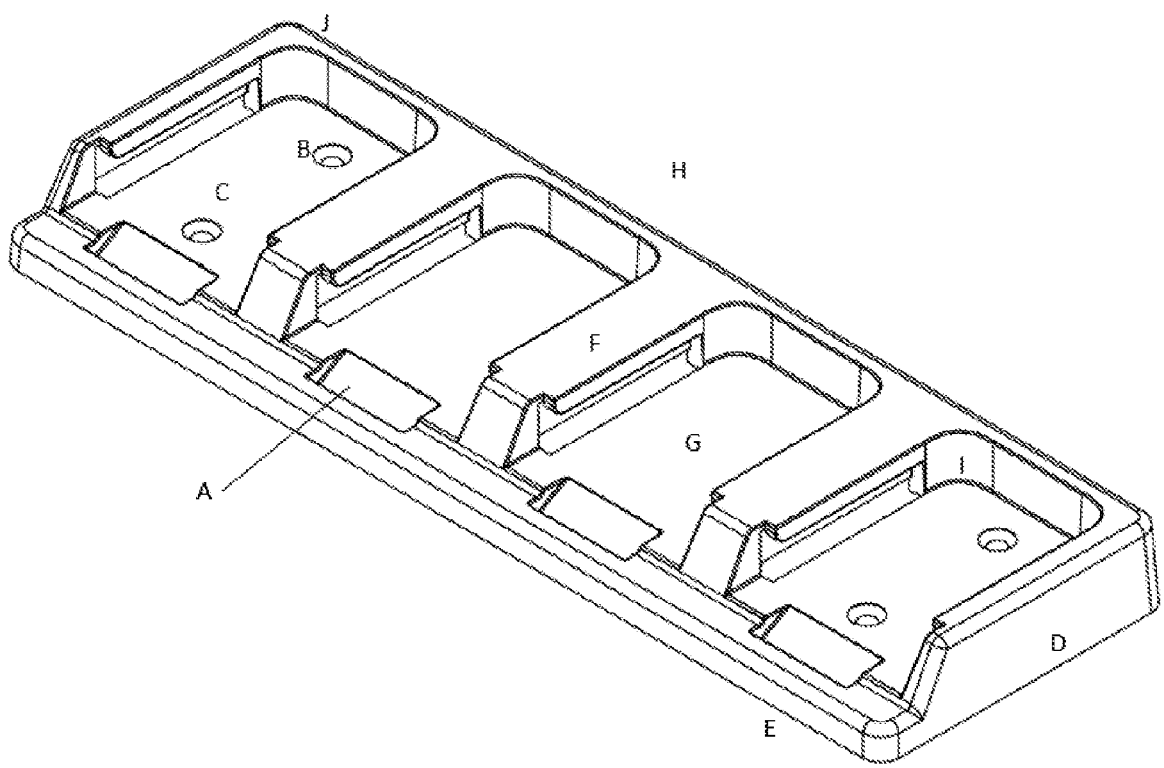
FIG. 4 shows example embodiments.

With reference to FIG. 4*a*, one arrangement suitable for Makita branded batteries can be seen, in which the preferred dimensions are:

A. locking mechanism size 15 mm×34 mm×5.5 mm with a 20 degree angle
B. Rear Screw Mounting holes Size 5.5 mm Counter sunk section 10 mm fits screws gauge 8 and 10. distance from back 23 mm
C. Front screw mounting holes size 5.5 mm counter sunk section 10 mm fits screws gauge 8 and 10. Distance from front 34 mm
D. Side wall height 27 mm length 104 mm with a 61 degree angle
E. Front lower section Length 14 mm Height 8 mm
F. Distance between compartments 24 mm
G. Battery locking section Width 56 mm Length 81 mm height 15 mm
H. Overall length 318 mm
I. Internal Radius 8.125
J. external Radius 5.260

Figure 4B:
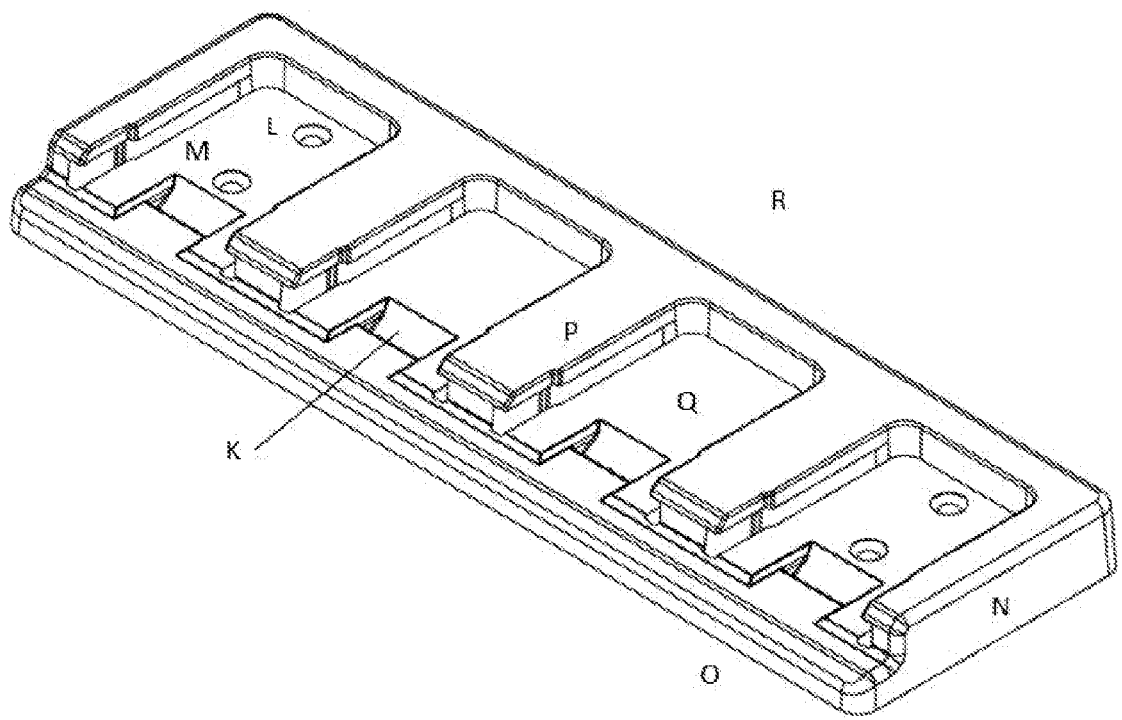

In an alternative arrangement, with reference to FIG. 4*b*, a holder suitable for a Bosch branded battery can be seen, in which the preferred dimensions are:

K. locking mechanism Size 23.5 mm×13 mm×4 mm
L. Rear Screw Mounting holes Size 5.5 mm Counter sunk section 10 mm fits screws gauge 8 and 10. distance from back 24 mm
M. Front screw mounting holes size 5.5 mm Counter sunk section 10 mm fits screws gauge 8 and 10. Distance from front 46 mm
N. Side wall height 22.5 mm length 100 mm
O. Front lower section Length 320 mm Height 10 mm
P. Distance between batteries 28 mm
Q. Battery locking section Width 52 mm Length 68 mm height 10 mm
R. Over all length 320 mm More specifically, for a Bosch branded battery, the dimensions of a battery holder capable of holding four batteries could be:

| | |
|---|---:|
| Length | 320 mm |
| Width | 100 mm |
| Height | 22.5 mm |
| Distance between holes (Vertically) | 30 mm |
| Distance between holes (horizontally) | 237.7 mm |
| Space between batteries | 28 mm |
| Thickness of top walls | 2 mm |
| Thickness of support ribs | 1.5 mm |
| Size of holes | 5.5 mm |
| Size of counter sunk section of holes | 10 mm |
| Screw sizes that fit holes | 8 and 10 gauge |
| Color | Blue |
| Height with 3.0 AH battery inserted | 67 mm |
| Distance from rear hole to the back | 24 mm |
| Distance of front hole to the front | 46 mm |
| Distance from outside battery to the outside of the holder | 15 mm |
| Height of support ribs | 14 mm |
| Number of screws Holes | 4 |
| Width of locking section | 13 mm |
| Length of locking section | 23.5 mm |
| Depth of locking section | 4 mm |
| Height of front lower section | 10 mm |
| With of front lower section to bottom of tapered angle | 15 mm |
| Width of battery locking section | 52 mm |
| Length of battery locking section | 68 mm |

The battery holders can be made as a single unit through injection moulding. This provides a single piece without moving or removable parts. A single part has the advantage that components will not be lost over time. Further, the lack of moving parts should improve the life of the product by reducing the risk of breakage. That is, moving parts can be more susceptible to breakage.

In some arrangements, moving parts may be included. For example, an extra locking mechanism may be included to further restrain the batter pack in position. This may be desired if the holder is mounted on a moving vehicle that traverses very rough terrain. However, it is expected that in most cases the locking portion will be sufficient.

Currently the Applicants prefer to make the holders from ABS (Acrylonitrile Butadiene Styrene) plastic. This is because it is light in weight whilst being strong and heat resistant. Alternative material could include polypropylene, nylon, polycarbonate and polystyrene or glass-filled varieties.

The Applicants believe that a linear arrangement—as seen in FIG. 1—is preferred. This will provide a line of batteries that could be mounted in various locations. An alternative arrangement however could be to arrange the batteries in a grid pattern, for example two by two. This would form a substantially square holder as opposed to the substantially rectangular holder of FIG. 1. In some cases the grid arrangement may be preferred due to the location the holder will be kept.

It is expected that in most applications the holder will be configured such that each of the batteries is aligned the same way. In the case of FIG. 1, the locking mechanism is located along the front edge. However, other embodiments may have the battery compartments aligned in opposite directions. This may be suitable for example if the holder is to be mounted in the middle of a workbench that is accessed from both sides.

Most, if not all, power tool batteries are different in size, shape and connection mechanism. To accommodate this, respective embodiments of the present invention should be configured to accommodate each of the various manufacturer's battery (for example Makita, Milwaukee, Dewalt, Bosch and AEG)

The battery holder 1 of the present invention is designed to enable a tradesperson to store a plurality of batteries from the same manufacturer at the same time. Some embodiments may elect to store batteries from different manufacturers. This may for example be suitable in a teaching or training environment in which students may bring their own batteries. However, it is expected that in the majority of cases it will be desired that the holder be suitable for a single brand/design of battery.

Each battery holder is designed to leverage the batteries' locking mechanism, meaning that they can be mounted in any direction and the batteries should not fall out.

The battery holder could be mounted to any flat surface such as trade trailers, vans, sheds, garages, tool shops, farms and trade schools. The holder could be mounted by any suitable means, such as for example, with screws. Alternatively, in some arrangements adhesive pads (or simply adhesive) could be used to join the holder to a surface.

The battery holder of the present invention provides for the easy storage of multiple batteries. The holder improves organisation and saves time, and protects valuable assets from loss or damage.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment.

Furthermore, the particular features, structures, or characteristics may be combined in any suitable manner in one or more combinations. It will be appreciated that persons skilled in the art could implement the present invention in different ways to the one described above, and variations may be produced without departing from its spirit and scope.

Any discussion of documents, devices, acts or knowledge in this specification is included to explain the context of the invention. It should not be taken as an admission that any of the material forms part of the prior art base or the common general knowledge in the relevant art, in any country, on or before the filing date of the patent application to which the present specification pertains.

The invention claimed is:

1. A wall-mountable power tool battery holder comprising more than one individual compartment, each individual compartment configured for receiving a respective battery and including a first side wall, a second side wall, a rear wall, a base, and a locking portion to secure the respective battery, the locking portion being located on the base, opposite the rear wall, at an open side the compartment, wherein:

the more than one compartments are arranged linearly;

the power tool battery holder is mountable to a wall by one or more countersunk screws so as to allow a screw head to sit flush with or below a surface of the base of the the wall-mountable power tool battery holder;

each individual compartment of the wall-mountable power tool battery holder is configured to store while keeping the respective battery of the individual compartment from being charged or discharged; and a reverse side of the wall-mountable power tool battery holder comprises ribbing configured to provide strength during injection molding of the wall-mountable power tool battery holder.

2. The wall-mountable power tool battery holder of claim 1, wherein the wall-mountable power tool battery holder has a length between 318 mm and 331.5 mm, a height between 22.5 mm and 27 mm, and a width between 90 mm and 104 mm.

3. The wall-mountable power tool battery holder of claim 1, wherein at least one of the first side wall or the second side wall of each individual compartment includes a lip to engage the respective battery.

4. The wall-mountable power tool battery holder of claim 1, wherein each individual compartment is a female component moulded to complement a male component of the respective battery.

5. The wall-mountable power tool battery holder of claim 2, wherein at least one of the first side wall or the second side wall of each individual compartment includes a lip to engage the respective battery.

6. The wall-mountable power tool battery holder of claim 2, wherein the locking portion of each individual compartment is located opposite said rear wall in the base of the individual compartment.

7. The wall-mountable power tool battery holder of claim 3, wherein the locking portion of each individual compartment is located opposite the rear wall in the base of the of the individual compartment.

8. The wall-mountable power tool battery holder of claim 2, wherein each individual compartment is a female component moulded to complement a male component of the respective battery.

9. The wall-mountable power tool battery holder of claim 3, wherein each individual compartment is a female component moulded to complement a male component of the respective battery.

10. The wall-mountable power tool battery holder of claim 5, wherein each individual compartment is a female component moulded to complement a male component of the respective battery.

11. The wall-mountable power tool battery holder of claim 6, wherein each individual compartment is a female component moulded to complement a male component of the respective battery.

12. The wall-mountable power tool battery holder of claim 7, wherein each individual compartment is a female component moulded to complement a male component of the respective battery.

13. The wall-mountable power tool battery holder of claim 1, wherein the wall-mountable power tool battery holder is a single injection moulded unit.

14. The wall-mountable power tool battery holder of claim 2, wherein the wall-mountable power tool battery holder is a single injection moulded unit.

* * * * *